US012188638B2

(12) United States Patent
Reilly et al.

(10) Patent No.: US 12,188,638 B2
(45) Date of Patent: Jan. 7, 2025

(54) LIGHT FIXTURE WITH HIDDEN AND LOCKABLE TILT APPARATUS

(71) Applicant: Lucifer Lighting Company, San Antonio, TX (US)

(72) Inventors: Jack Reilly, San Antonio, TX (US); Anuj Maloo, San Antonio, TX (US); Benjamin Karpen, San Antonio, TX (US)

(73) Assignee: Lucifer Lighting Company, San Antonio, TX (US)

( * ) Notice: Subject to any disclaimer, the term of this patent is extended or adjusted under 35 U.S.C. 154(b) by 0 days.

(21) Appl. No.: 18/202,507

(22) Filed: May 26, 2023

(65) Prior Publication Data

US 2023/0383934 A1 Nov. 30, 2023

Related U.S. Application Data

(60) Provisional application No. 63/346,887, filed on May 29, 2022.

(51) Int. Cl.

| | |
|---|---|
| ***F21V 21/116*** | (2006.01) |
| ***F21S 8/04*** | (2006.01) |
| ***F21V 21/14*** | (2006.01) |
| ***F21V 21/30*** | (2006.01) |
| ***F21Y 115/10*** | (2016.01) |

(52) U.S. Cl.

CPC ............. *F21V 21/116* (2013.01); *F21S 8/043* (2013.01); *F21V 21/14* (2013.01); *F21V 21/30* (2013.01); *F21Y 2115/10* (2016.08)

(58) Field of Classification Search

CPC ........ F21V 21/14; F21V 21/30; F21V 21/116; F21V 21/008; F21S 8/043

See application file for complete search history.

(56) References Cited

U.S. PATENT DOCUMENTS

| | | | | |
|---|---|---|---|---|
| 5,593,224 | A * | 1/1997 | Kunkel | F21V 21/30 362/426 |
| 6,280,056 | B1 * | 8/2001 | Dolan | F21V 21/26 362/427 |
| 2007/0014115 | A1 * | 1/2007 | Katz | F21V 21/30 362/382 |
| 2018/0340646 | A1 * | 11/2018 | Mehdi | F16M 11/2035 |
| 2022/0243900 | A1 * | 8/2022 | Kemparaju | F21V 17/02 |

* cited by examiner

*Primary Examiner* — William N Harris

(74) *Attorney, Agent, or Firm* — Harness, Dickey & Pierce, P.L.C.

(57) ABSTRACT

A light fixture has a stem with a first portion and second portion disposed at an angle relative to the first portion. The light fixture also includes a housing may include a body cap. The body cap may include an opening receiving the stem therethrough, said housing may include a light source therein. The light fixture also includes a coupler extending from the second portion. The light fixture also includes the body cap rotatable about an axis of rotation defined through the coupler.

20 Claims, 12 Drawing Sheets

LIGHT FIXTURE WITH HIDDEN AND LOCKABLE TILT APPARATUS

CROSS-REFERENCE TO RELATED APPLICATION

This is a non-provisional application of provisional application 63/346,887 filed on May 29, 2022, the disclosure of which is incorporated by reference herein.

FIELD

The present disclosure relates to light fixtures and, more specifically, to a light fixture that has a hidden and lockable tilt mechanism.

BACKGROUND

This section provides background information related to the present disclosure which is not necessarily prior art.

Many types of pivoting light fixtures are available. Pivoting lights typically have a pivot mechanism that is relatively bulky and unsightly. In some fixtures, when the pivoting location of the member is partially hidden from plain site, the member is capable of pivoting less than 90 degrees. Ball joints, standard hinges, articulating hinges, trap door hinges are mechanisms to mount the light fixture in a pivoting way. However, all of these mechanisms are normally visible or reveal themselves when the member is tilted.

In lighting, it is also beneficial to create a product that can convert from having ceiling mounted functionality to one that has wall-mounted functionality as well.

SUMMARY

This section provides a general summary of the disclosure and is not a comprehensive disclosure of its full scope or all of its features.

One general aspect includes a light fixture having a stem with a first portion and second portion disposed at an angle relative to the first portion. The light fixture also includes a housing may include a body cap, said body cap may include an opening receiving the stem therethrough, said housing may include a light source therein. The light fixture also includes a coupler extending from the second portion. The light fixture also includes said body cap rotatable about an axis of rotation defined through the coupler.

Implementations may include one or more of the following features. The light fixture where a first axis of first portion is perpendicular to a second axis of the second portion. The coupler may include a first hold down and a second hold down coupled to the body cap, said coupler may include a first pin portion coupled between the first hold down and the body cap and a second pin portion coupled between the second hold down and the body cap so the body cap rotates about the first pin portion and the second pin portion. The first pin portion is formed by a torque engine. The torque engine may include a first head and a pin, said pin extending into the coupler. The body cap may include a first recess receiving at least a portion of the first head and the second portion of the stem. The first hold down may include a first groove, said first hold down holding the first pin portion within the first groove and the recess and the second hold down may include a second groove, said second hold down holding the second pin portion within the second groove and the recess. The coupler is disposed parallel to the first portion of the stem. The light fixture may include a fastener lock disposed through the body cap, said fastener lock engaging the coupler. The stem is hollow and may include a light source disposed within the housing, said light source coupled to a wire extending within the stem. The light source may include light emitting diodes. The first portion may include a first longitudinal axis, the second portion may include a second longitudinal and the coupler may include a third longitudinal axis perpendicular to the first longitudinal axis and the second longitudinal axis. The housing is cylindrical. The housing may include a cavity disposed between a body cap and an inner housing, said cavity receiving at least a portion of the second portion.

One general aspect includes a light fixture having a hollow stem may include a first portion and a second portion disposed perpendicular to the first portion. The light fixture also includes a housing may include body cap, said body cap may include an elongated opening receiving the second portion of the hollow stem therethrough, said housing may include a light source coupled to wires extending through the hollow stem. The light fixture also includes a coupler extending perpendicular to the second portion and parallel to the first portion, said coupler may include a first pin portion axially aligned with a second pin portion. The light fixture also includes a first hold down coupling the first pin portion to the body cap. The light fixture also includes a second hold down coupling the second pin portion to the body cap, so that the body cap and housing rotates relative to the coupler.

Implementations may include one or more of the following features. The light fixture where said first pin portion and said second pin portion are disposed on an axis perpendicular to the first portion and the second portion. The first pin portion is formed by a torque engine may include a first head and a pin, said body cap may include a recess, said light fixture may include a first hold down holding the first head and in the recess and a second hold down holding the second pin portion in the recess. The light fixture may include a fastener lock disposed through the body cap at the recess, said fastener lock engaging the coupler. The first portion may include a first longitudinal axis, the second portion may include a second longitudinal and the coupler may include a third longitudinal axis perpendicular to the first longitudinal axis and the second longitudinal axis. The housing may include a cavity disposed between a body cap and a driver, said cavity receiving at least a portion of the second portion.

In the present disclosure, the light fixture has the ability to tilt 90 degrees and allows versatility in the housing position. That is, the present examples may be a wall mounted fixture used to illuminate the floor and ceiling directly above or below the light fixture, along with illuminating the wall adjacent to the light fixture. This ability to achieve 90 degrees of tilt, along with the ability to maintain a clean, streamlined look, is novel and provides a competitive market advantage.

The advantage in the present design is the hidden nature of the locking mechanisms and the mechanical lock preventing movement. The ability to lock tilt and rotation is an advancement in product performance allowing for the light fixture position to remain constant throughout its life. Being concealed is novel and provides a competitive market advantage.

This ability to achieve 90 degrees of tilt, along with the ability to maintain a clean, streamlined look, is novel and provides a competitive market advantage. The ability to lock tilt and rotation is an advancement in product performance allowing for the light fixture position to remain constant throughout its life. Being concealed is novel and provides a competitive market advantage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The disclosure is an apparatus and method for tilting a light fixture in excess of 90 degrees while continually hiding the pivot point. Additionally, the disclosure maintains a constant cross section along the visible length of the pivoting member and can pass power and/or control wires through the pivoting member. Additionally, the disclosure achieves the full range of tilt while maintaining a flat top and without requiring cutouts in the top or sides of the body, and without revealing the means with which the member is attached to the fixture. Additionally, the mechanism allows for the fixture tilt to be locked into place by mechanical non-visible means, not relying on friction.

Figure 1:
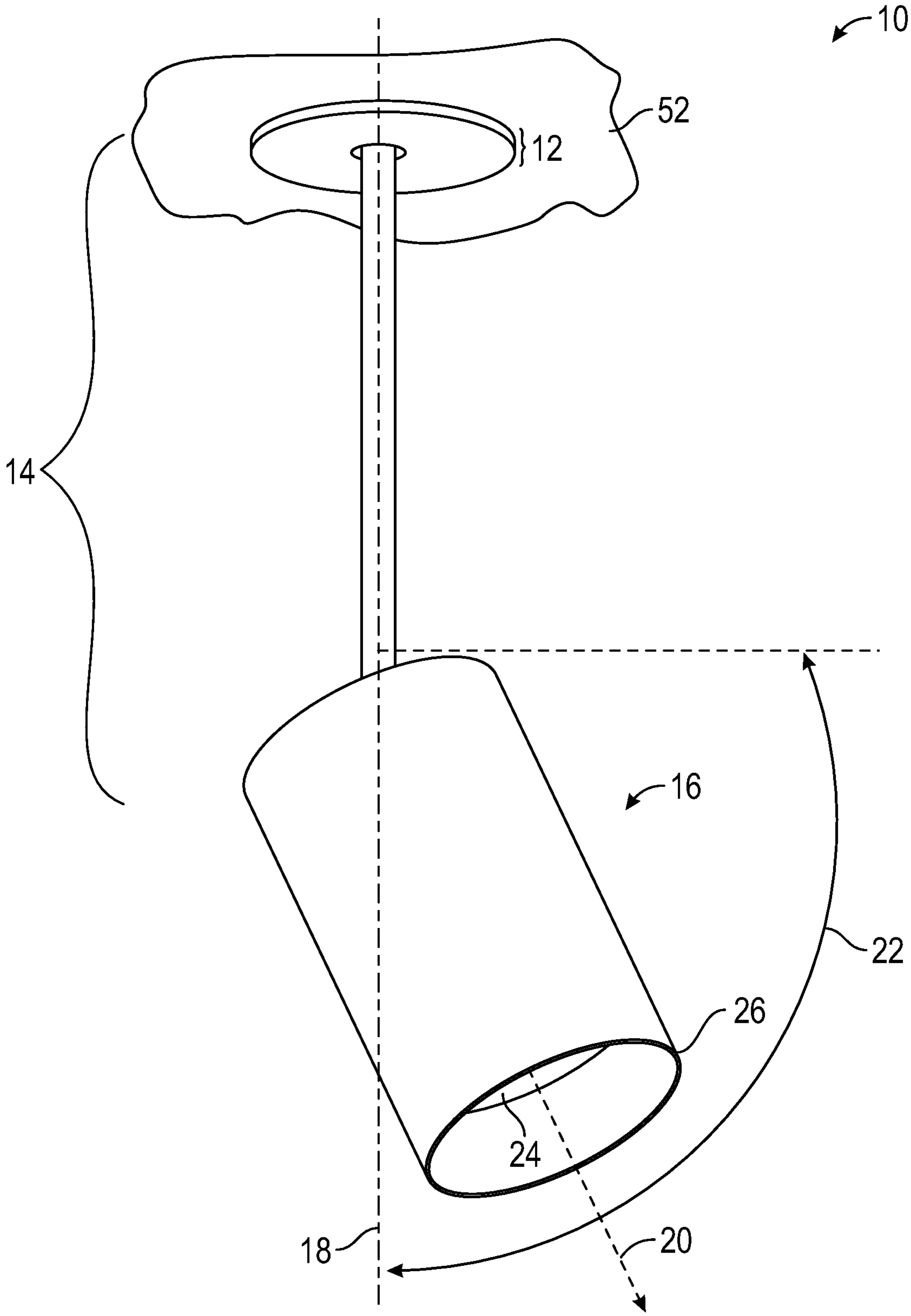
FIG. 1 is a perspective view of a light fixture according to the present disclosure.

Referring now to FIG. 1, a light fixture 10 has a mounting portion 12, a stem 14 and a housing 16. The mounting portion 12 is used to secure the light fixture 10 to a ceiling or a wall. The stem 14 spaces the housing 16 from the mounting portion 12. The stem 14 has a first longitudinal axis 18. The housing 16 has a longitudinal axis 20. The housing 16 secures a light source therein. The housing 16 is allowed to move relative to the stem 14. That is, the longitudinal axis 20 of the housing 16 may be positioned parallel to the first longitudinal axis 18 of the stem 14. The longitudinal axis 20 of the housing 16 may also be positioned perpendicular to the first longitudinal axis 18 of the stem 14 so that an annular range of movement 22 is about 90°. The word “about” is used to mean within 5° of 90° (from 85°-95°).

The housing 16 may include a lens 24 used to cover the light source and diffuse the light as needed. A trim ring 26 may be used for aesthetic appeal and to hold the lens 24 in place.

In the present example, the housing 16 is cylindrical. However, such shapes, such as rectangular solids, may be used.

Figure 2A:
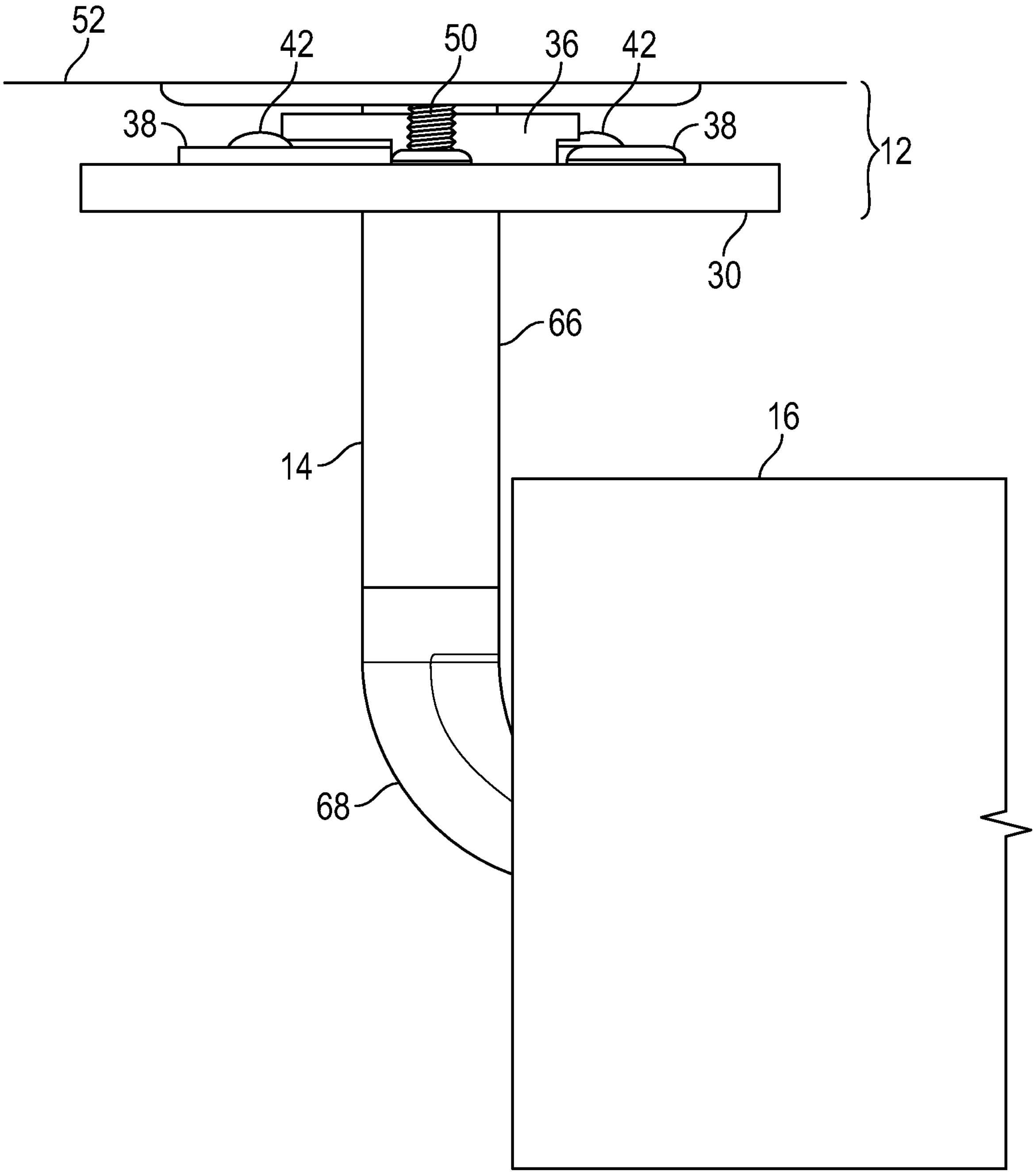
FIG. 2A is a side view of the light fixture angled at 90° relative to a stem.
Figure 2B:
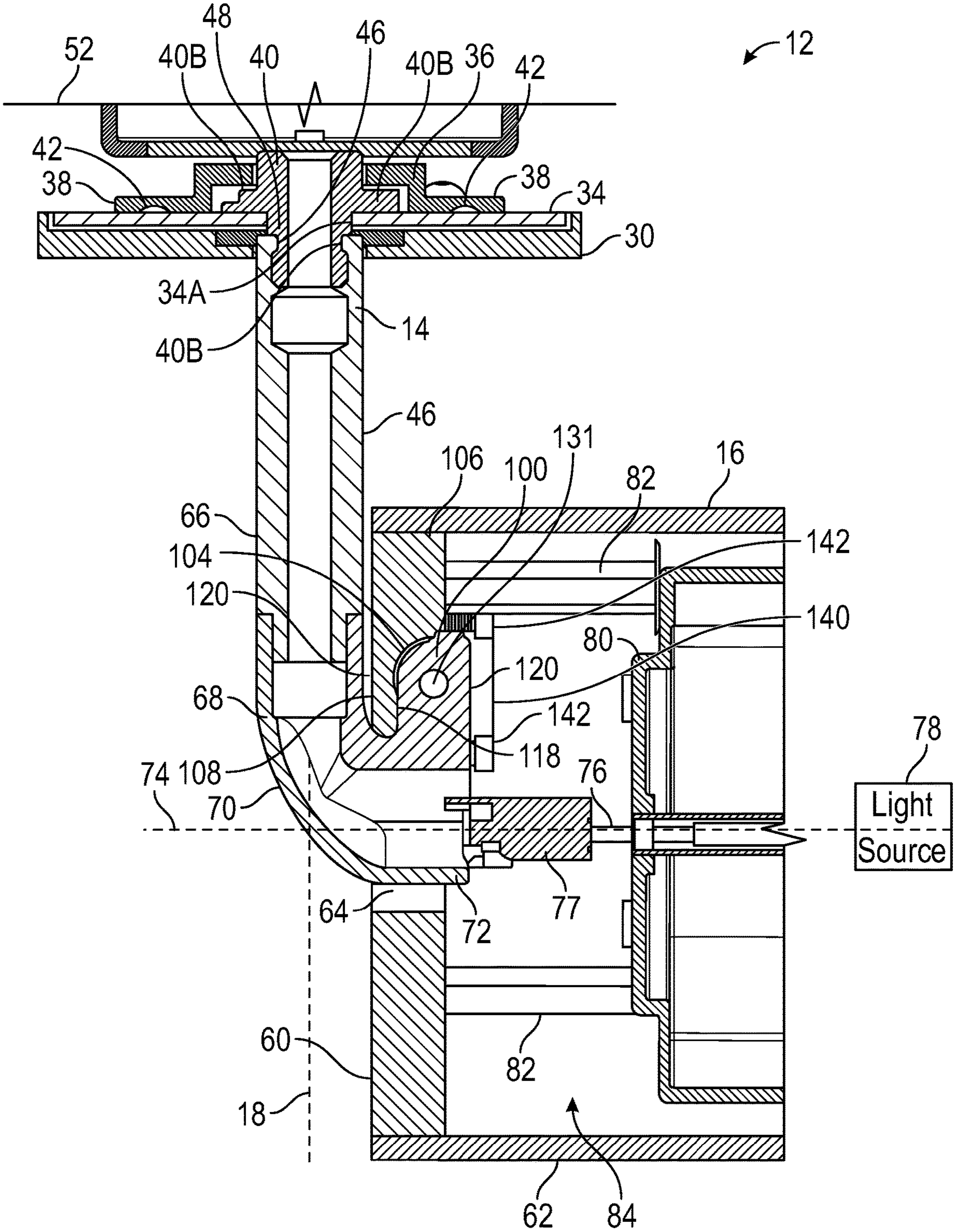
FIG. 2B is a cross-sectional view of the light fixture of FIG. 2A.
Figure 3A:
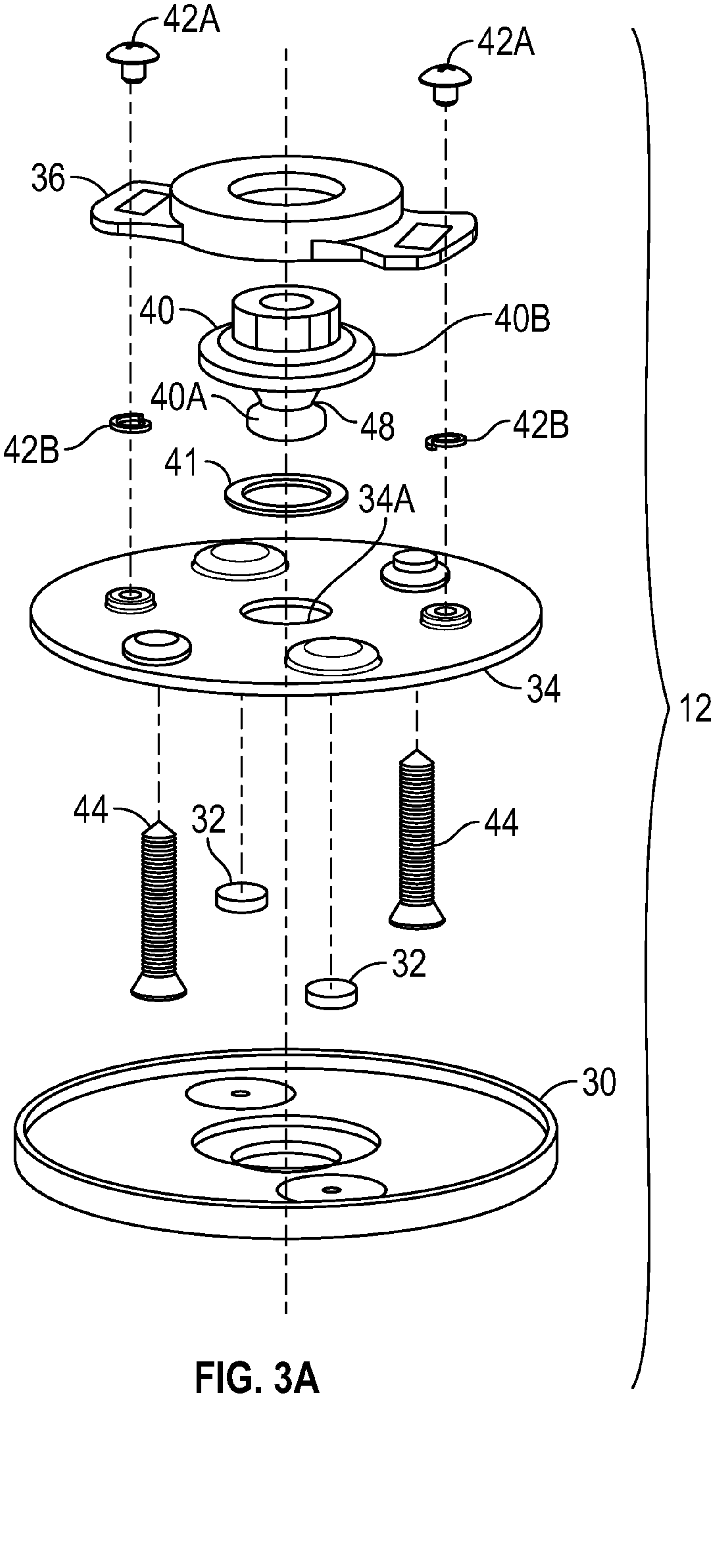
FIG. 3A is an exploded view of a first portion of the light fixture of FIGS. 1-2A.
Figure 3B:
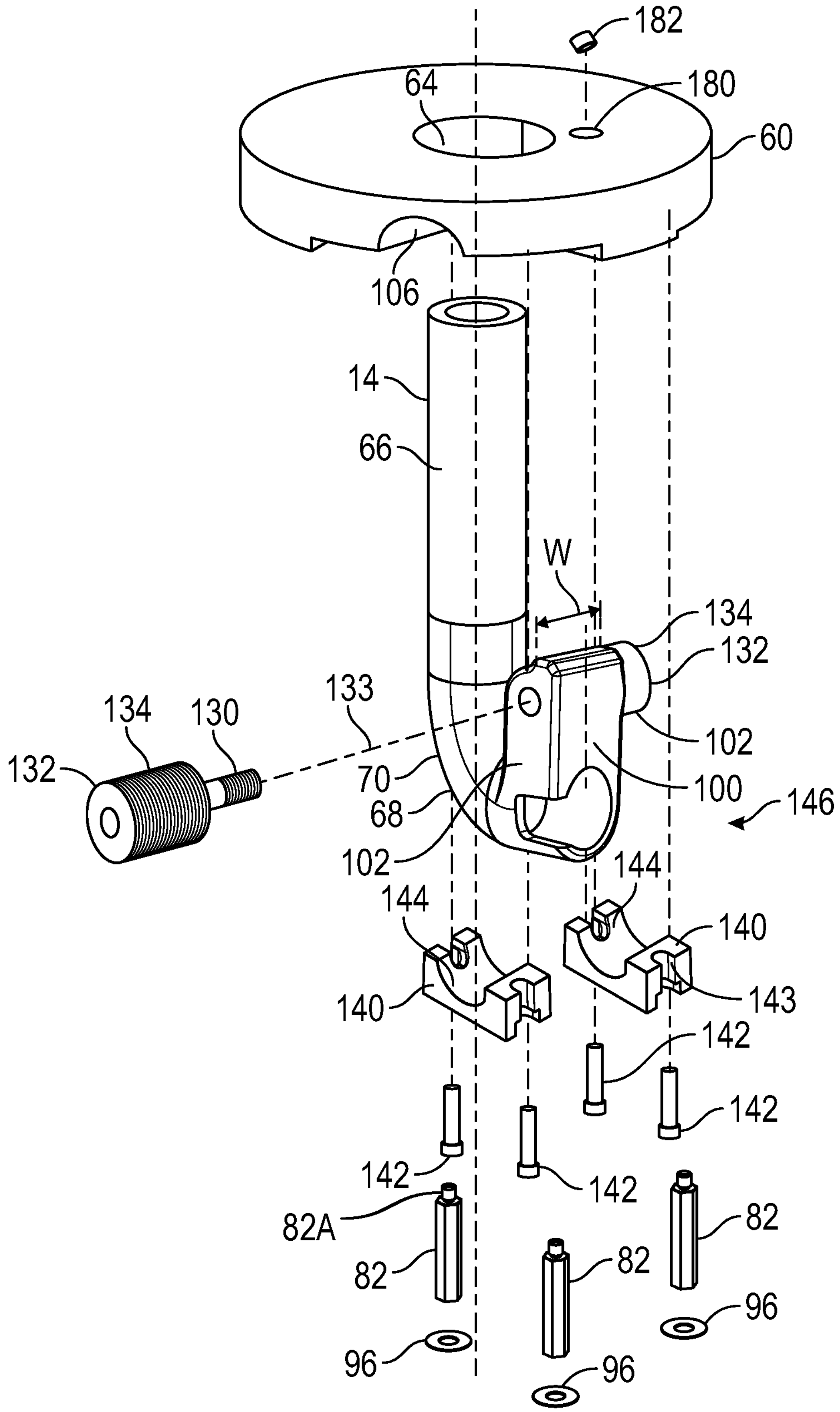
FIG. 3B is an exploded view of a second portion of the light fixture of FIGS. 1, 2A and 3B.
Figure 3C:
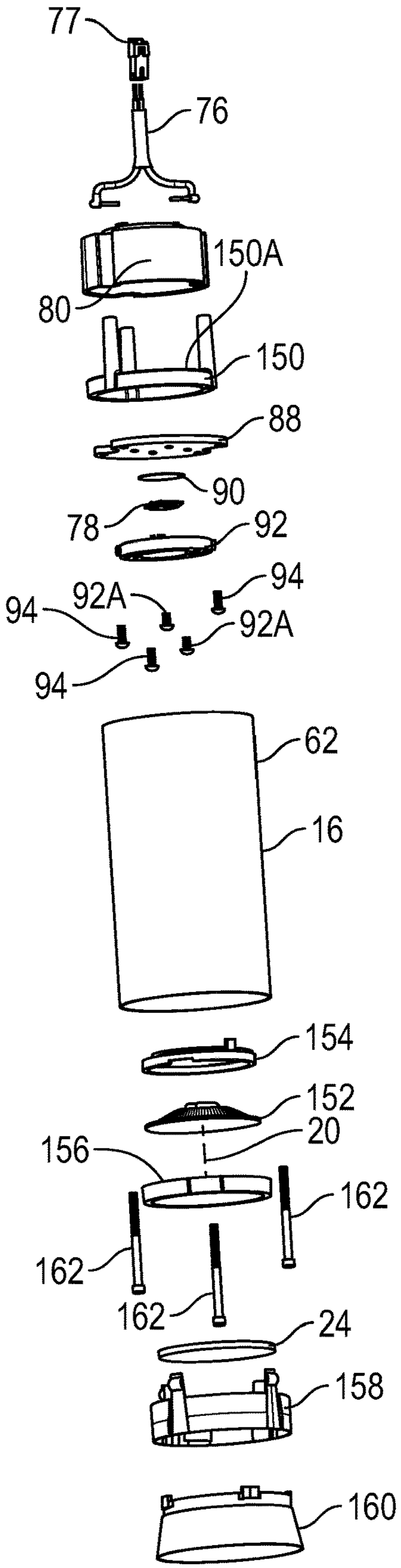
FIG. 3C is an exploded view of a first example of a third portion of the light fixture.

Referring now to FIGS. 2A, 2B and 3A, a side view, a cross-sectional view and an exploded view of the mounting portion 12 is illustrated. The exploded view in FIG. 3A is a top or first portion of the light fixture. A cover plate 30 may be used to provide an aesthetically pleasing and finished look for the light fixture 10 and the mounting. The cover plate 30 may be formed of steel and is therefore magnetic. As illustrated in FIG. 3A, magnets 32 secured to a mounting plate 34 may secure the cover plate 30 to the mounting plate 34 by magnetic action.

Ultimately, a mounting cover 36 having wings 38 is secured to the mounting plate so that a mount 40 is secured between the mounting cover 36 and the mounting plate 34. The mount 40 has a lower portion 40A that receives the end of the stem 14 to secure the stem 14 to the mount 40. The mount 40 has a flange portion 40B that is wider than the opening 34A in the mounting plate 34. The opening 34A has the lower portion 40A of the mount 40 extending therethrough. Fasteners 42 may be used to secure the wings 38 of the mounting cover 36 to the mounting plate 34. Fasteners 44 may be used to secure the mounting plate 34 to an electrical box or a ceiling or wall. A flange 46 may be received in a groove of the lower portion 40A. A rotation washer 41 may be used to secure the stem 14 to the lower portion 40A. Of course, a fastener 50 may also be used to secure the mounting portion 12 to a mounting position such as to an electrical box or ceiling 52.

Referring now specifically to FIGS. 2A, 2B, 3B and 3C, the housing 16 has a body cap 60 that is disposed therein or thereon. As mentioned above, the housing 16 may be a cylindrical housing and therefore the body cap 60 is also cylindrical. The body cap 60 is secured to the outer wall 62. The outer wall 62 is therefore annular when the housing 16 is cylindrical. The body cap 60 includes an elongated opening 64. The elongated opening 64 is sized just large enough to receive the stem 14 in the various positions.

The stem 14, in this example, is formed of a first portion 66 that is generally perpendicular to the mounting surface and has the longitudinal axis 18 described in FIG. 1 associated therewith. As illustrated in FIG. 2B, the first portion 66 of the stem 14 is hollow. A second portion 68 of the stem 14 is coupled to the first portion 66 of the stem 14 and is also hollow. Although two portions 66, 68 are described, the first portion 66 and the second portion 68 of the stem 14 may be integrally formed. The second portion 68 may have a bend 70 and a second end 72 that is disposed 90° to the first portion 66. The second end 72 of the second portion 68 of the stem 14 has a longitudinal axis 74 that is perpendicular to the longitudinal axis 18 of the first portion 66 of the stem 14.

The first portion 66 and the second portion 68 of the stem 14 are both hollow and receive wires 76 that extend therethrough. The wires 76 may have a connector 77 attached thereto. The wires 76 are used to provide power to a light source 78. The light source 78 may operate on AC or DC power. The light source 78 may be light emitting diodes or various other types of lights such as incandescent lights, organic light emitting diodes or the like. The light source 78 may be disposed within an inner housing or driver 80. The driver 80 is secured or spaced from the body cap 60 by spacers 82. Spacers 82 have a threaded end 82A received in openings 86 of the body cap 60. Between the driver 80 and the body cap 60 within the outer wall 62 is a cavity 84. The cavity 84 receives the second end 72 of the second portion 68 as the housing 16 is rotated into various positions relative to the stem 14. The driver 80 may contain circuitry for electrically driving the light source 78. A heat sink adapter 88 may have may be used to hold the light source 78. A thermal interface 90 may be disposed between the light source 78 and the adapter 88 to conduct heat to the adapter 88 for thermal dissipation. A holder 92 may be ring shaped and mounted around the light source 78 and secured to the adapter 88 by fasteners 92A. Fasteners 94 may extend through the heat sink adapter 88 and couple into an opening (not shown) to allow the position of the spacers 82 to be maintained. Washers 96 may be positioned between the spacers 82 and adapter 88 around fasteners 94.

The second end 72 of the second portion 68 of the stem 14 has a coupler 100 extending therefrom. The coupler 100 may be integrally formed with the second portion 68 of the stem 14. The coupler 100 extends in a direction 18' parallel with the longitudinal axis 18. The coupler 100 has a width W that is about the outer diameter of the second end 72 of the second portion 68 of the stem 14. That is, the coupler 100 has two end walls 102 that are spaced apart by the width W. A top wall 104, in this example, is curved and is received within a recess 106 of the body cap 60. The body cap 60 also has a flange 108 extending therefrom. The flange 108 is a reduced thickness portion of the body cap 60 to allow the coupler 100 to be received therein and allow clearance for the housing 16 to be rotated parallel to the electrical box or ceiling 52 onto which it is mounted.

The top wall 104 has a half cylindrical shape that extends between a first wall 118 and a second wall 120. The length of the top wall 104 is defined by the end walls 102. The space 121 between the first wall 118 and the stem 14, and in particular, the outer wall of the second portion 68 of the stem 14 forms a recessed groove 122. The recessed groove 122 receives the flange 108 as the housing 16 is rotated.

The coupler 100 forms a hinge 110 that allows the housing 16 to rotate relative thereto. The coupler 100 has pin portions 130A, 1306 that are axially aligned. The pin portions 130A, 130B may be formed as a head 134 of a torque engine 132. In addition to the head 134, the pin portions 130A and/or 1306 may be integrally formed with the coupler 100. In this example, one head 134 and one integrally formed pin portion 130A are used. The head 134 may be cylindrical in shape. A flat side 134A may be disposed on the outer wall of the head 134. A pin 131 may extend between the head 134 and the second pin portion 1306 within an opening 128 of the coupler 100 to increase the strength of the coupler 100. The pin 131 forms the axis 133 about which the hold down 140 and the body cap 60 rotate. The coupler 100 may be molded around the pin 131. The pin 131 may be formed of metal.

A pair of hinge hold downs 140 are coupled to the body cap 60 by threaded fasteners 142 that are received in channels 143 disposed on each end of each hold down 140. Although the channels 143 are open, the channels may also be closed (holes through the hold down). The body cap 60 has openings 148 for receiving the fasteners 142 to hold the hinge hold downs 140 in place. A groove 144 extends across the thickness of the hold downs 140. The groove 144 may be generally half circle in shape and may have a flat side 144A to engage the flat side 134A of the torque engine 132. The groove 144 receives the head 134 or pin portions 130A, 130B therein. The groove 144, together with the recess 106, receives the head 134 of the torque engine 132 to allow the head 134 to rotate therein. Thus, the torque engine 132 and the pin 130 form a hinge 146 about which the body cap 60 rotates.

A standoff 150 may be positioned around the driver 80. The standoff 150 may position the light source 78 relative thereto. That is, the driver may be located at a top portion 150A of the standoff so that a space is allowed or formed between the light source 78 positioned therebelow.

An optic 152 may be positioned within a cover 154 and held relative to the light source 78 within the housing 16. A lens retainer gasket 156 is used for retaining the lens 24 relative to a retainer 158 and a baffle 160. Grooves or the like may be formed within the housing 16 for retaining the retainer 158 thereto.

Fasteners 162 extend within the housing 16 and may engage the driver standoff 150. The fasteners 162 may be long enough to replace the fasteners 94 and extend into the spacers 82.

Figure 3D:
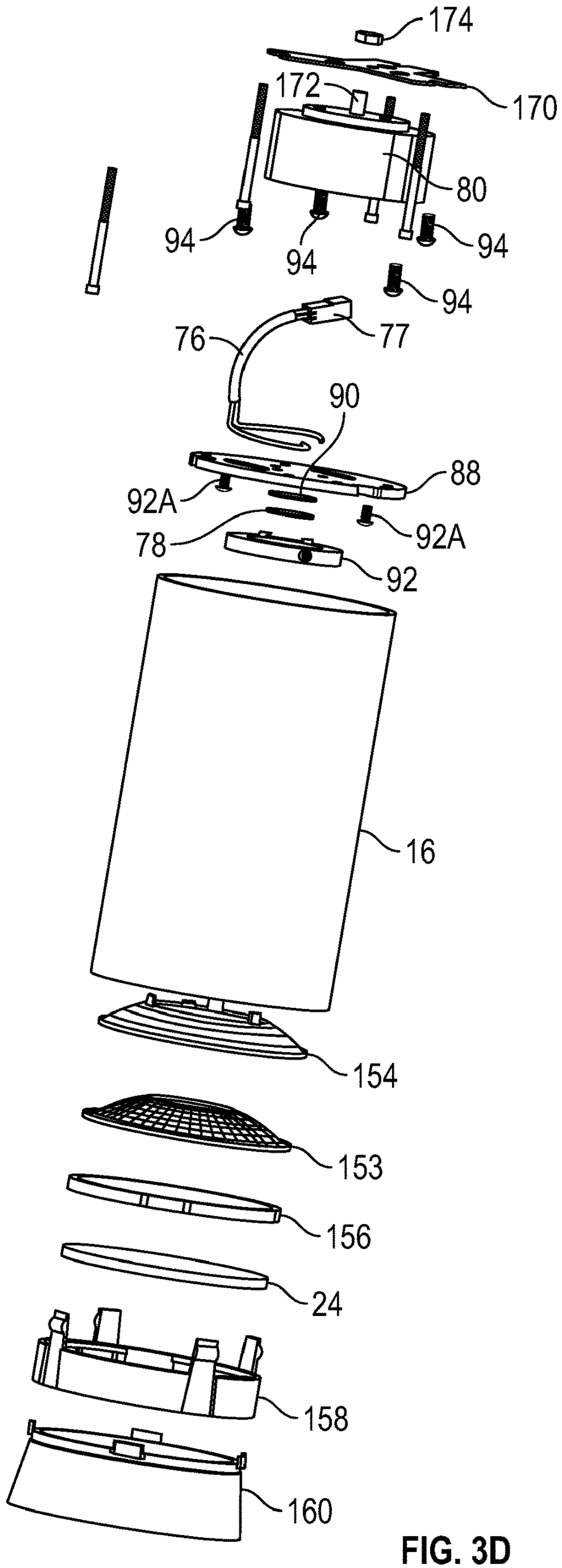
FIG. 3D is an exploded view of a second example of a third portion of the light fixture.
Figure 3E:
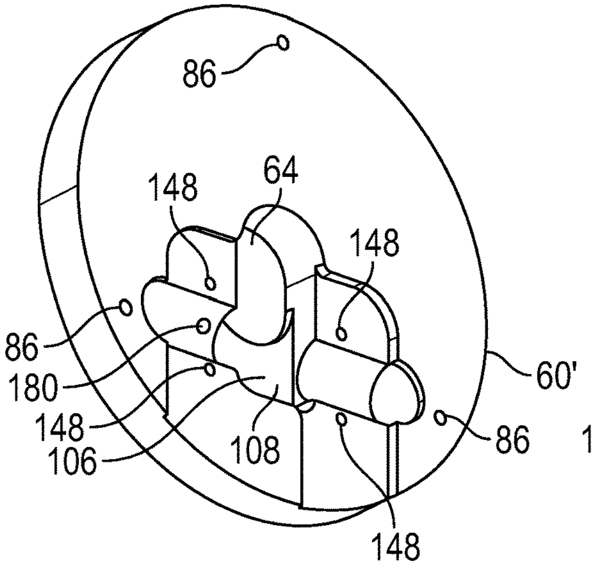
FIG. 3E is an elevational view of the inside of the body cap relative to the coupler used in the first example.

Referring now to FIGS. 3D and 3E, a second example of a cover 60' is formed in the area of the recess 106 which is slightly different in shape. The common components from FIG. 3A are enumerated the same as in FIG. 3B. Other differences include a driver mounting plate 170 that is used to mount the driver 80 within the housing 16. The driver mounting plate 170 is mounted to the driver 80 by a threaded fastener 172 and a nut 174.

Figure 3F:
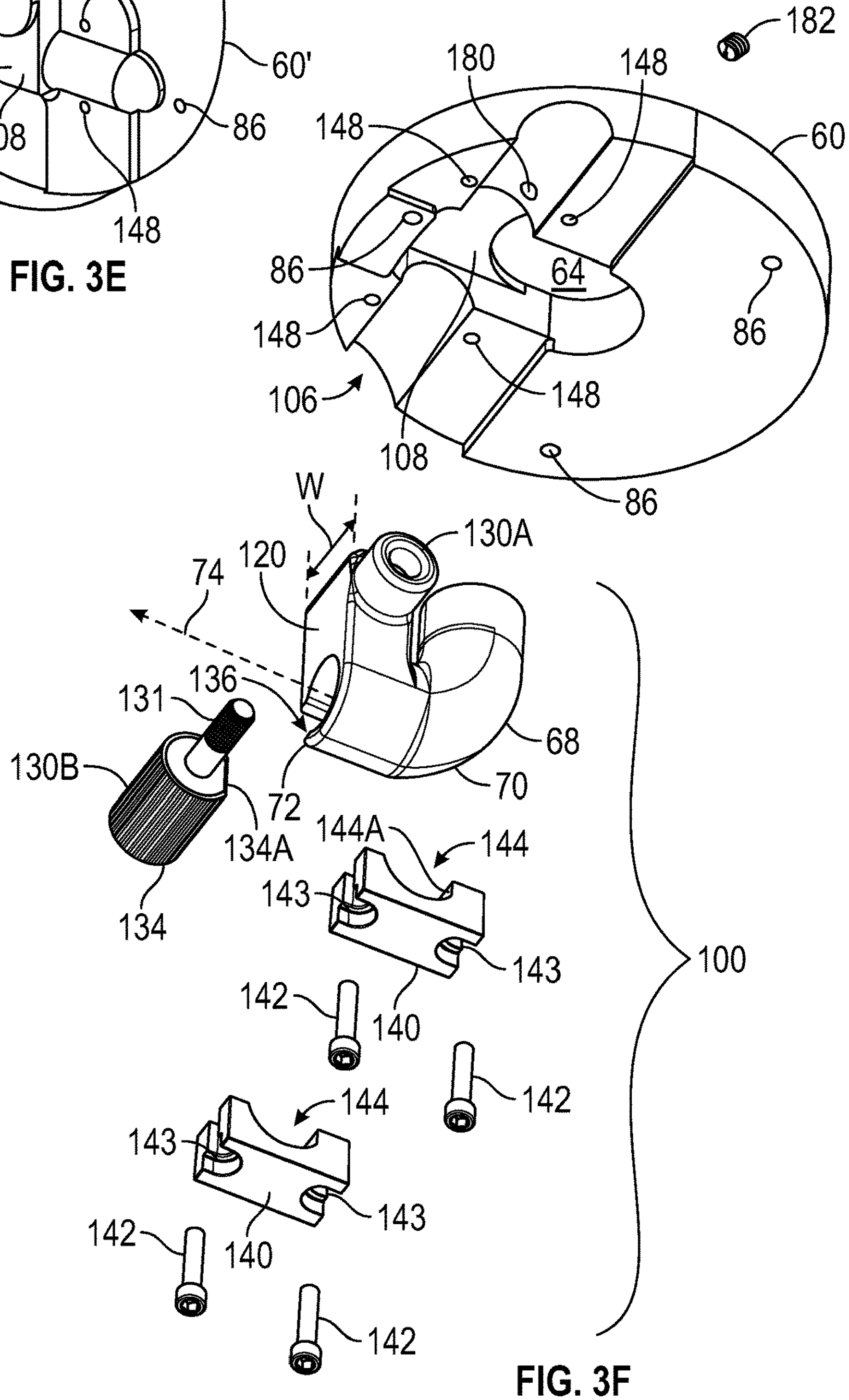
FIG. 3F is an exploded underside view of the coupler.
Figure 3G:
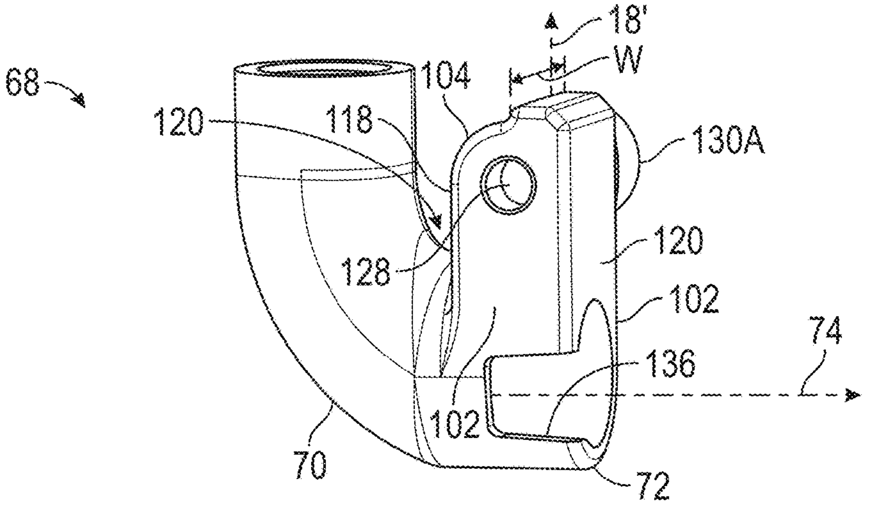
FIG. 3G is a side view of the second portion of the stem having a portion of the coupler.

As is best shown in FIGS. 3F and 3G, the second portion 68 may also have a cutout 136. The cutout 136 extends axially inward from the second end 72. The width of the cutout 136 is sized to accommodate the wires 76 that are run through the stem 14 for powering the light source 78.

Figure 4:
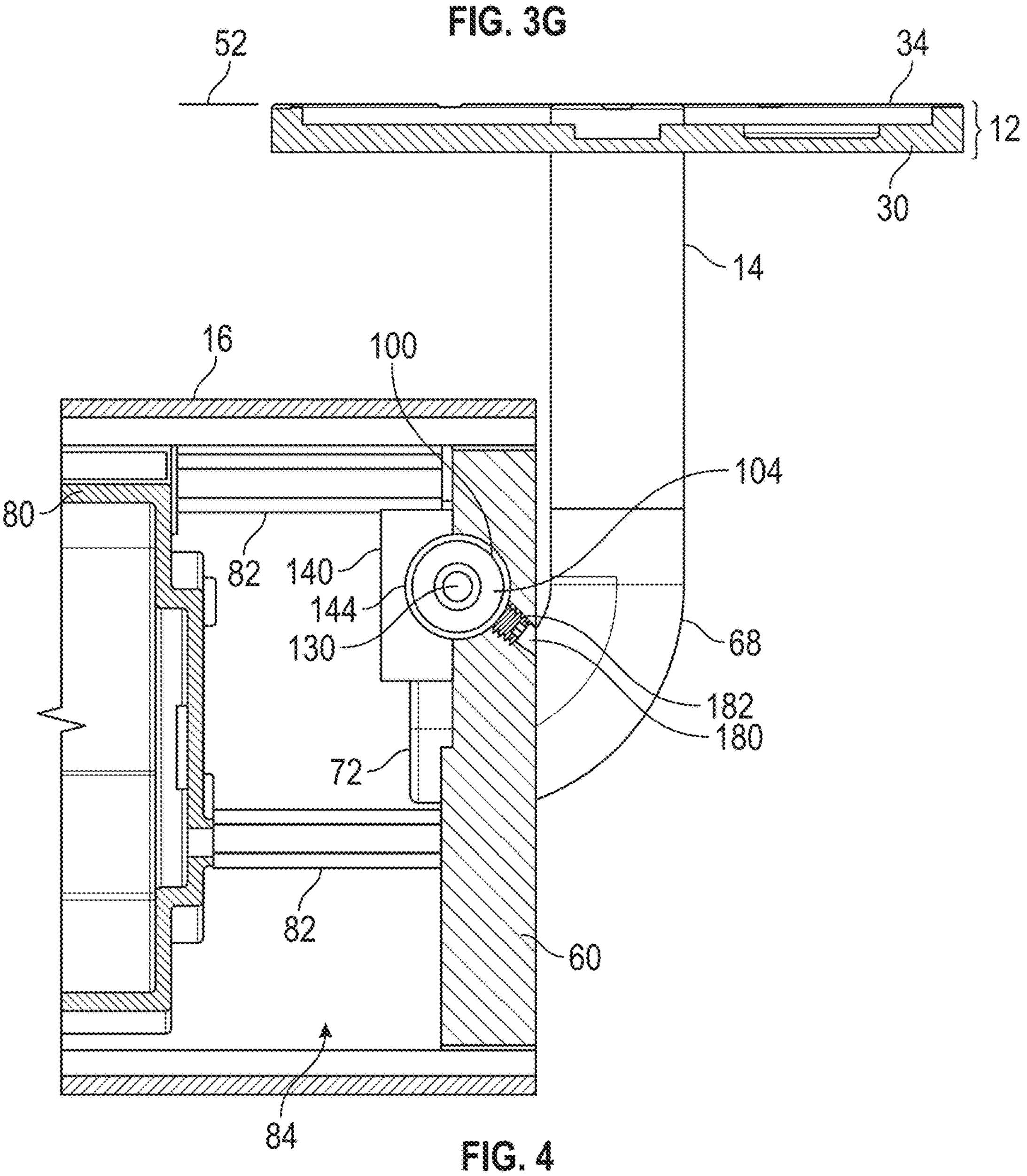
FIG. 4 is a cross-sectional view of the light assembly through the fastener lock.
Figure 5:
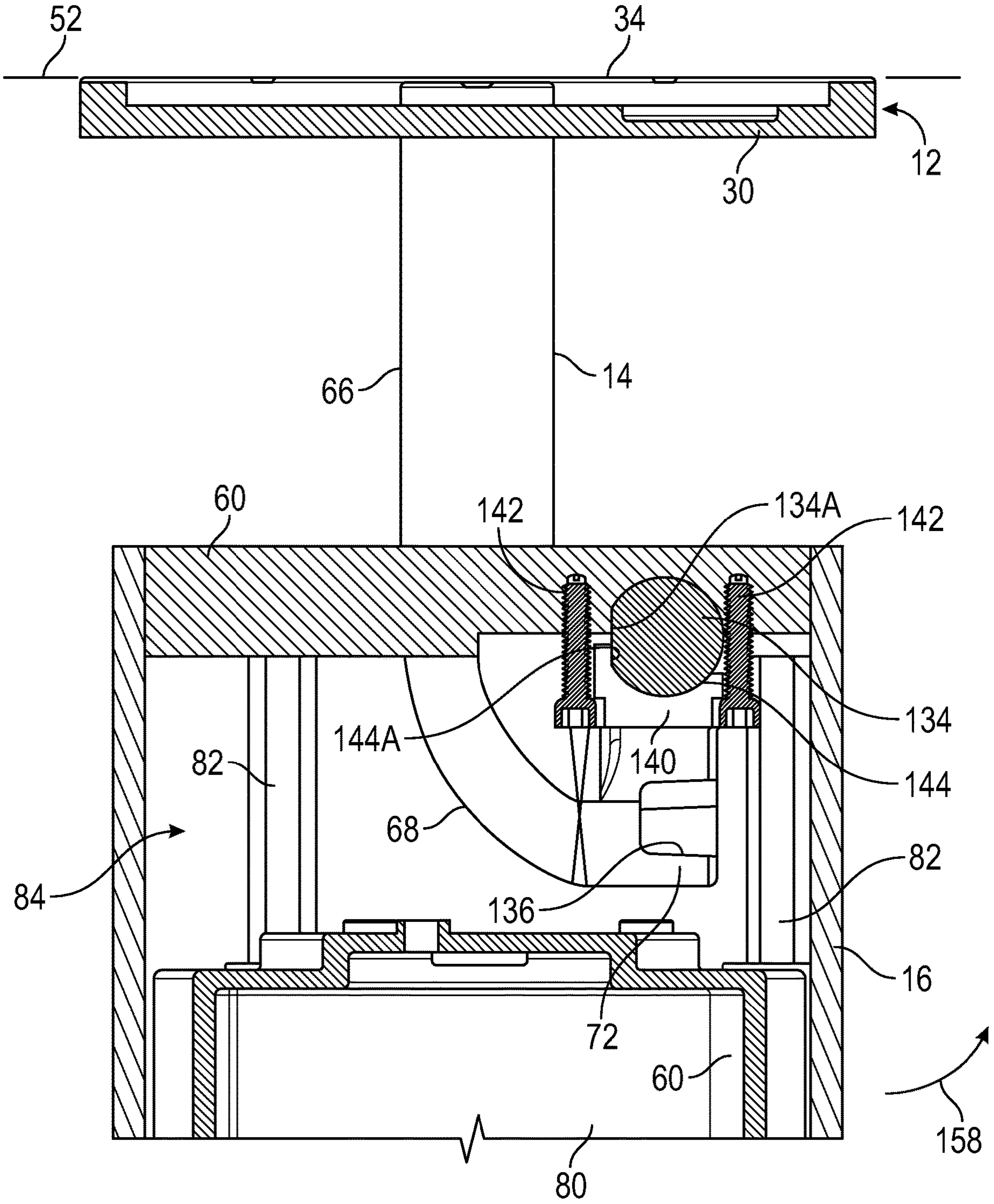
FIG. 5 is a cross-sectional view through the hold downs and the fasteners holding the hold downs to the body cap.

Referring now also to FIG. 4, a cross-sectional view of the threaded channel 180 and the fastener lock 182, in a fastened position, is illustrated. The fastener 182 is used for engaging the top wall 104 of the coupler 100. The fastener lock 182 is inserted and screwed deep into the threaded channel 180 until the fastener lock 182 engages the top wall 104 of the coupler 100. By this action, the rotation of the housing 16 about the pin 130 is prevented. The light housing 16 may be secured parallel to the electrical box or ceiling 52 perpendicular to the electrical box or ceiling 52 or any desired angle therebetween.

A cross-section view through the head 134 of the torque engine 132 is illustrated. The hold down 140 is illustrated with the groove 144 and the head 134 rotatably coupled therein. The direction of travel of the housing 16 is illustrated by the arrow 178.

Figure 6A:
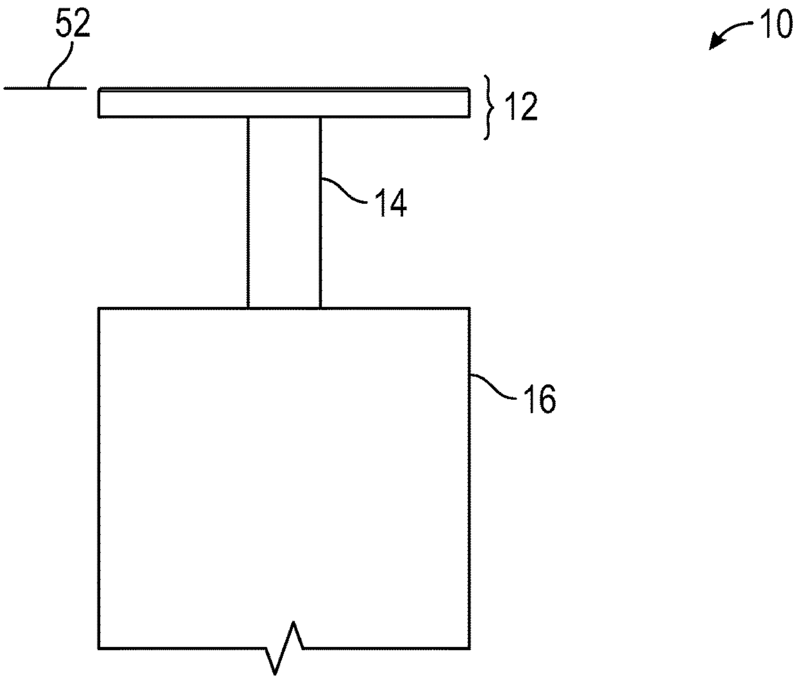
FIG. 6A is an elevational view of the light assembly in a downward position.
Figure 6B:
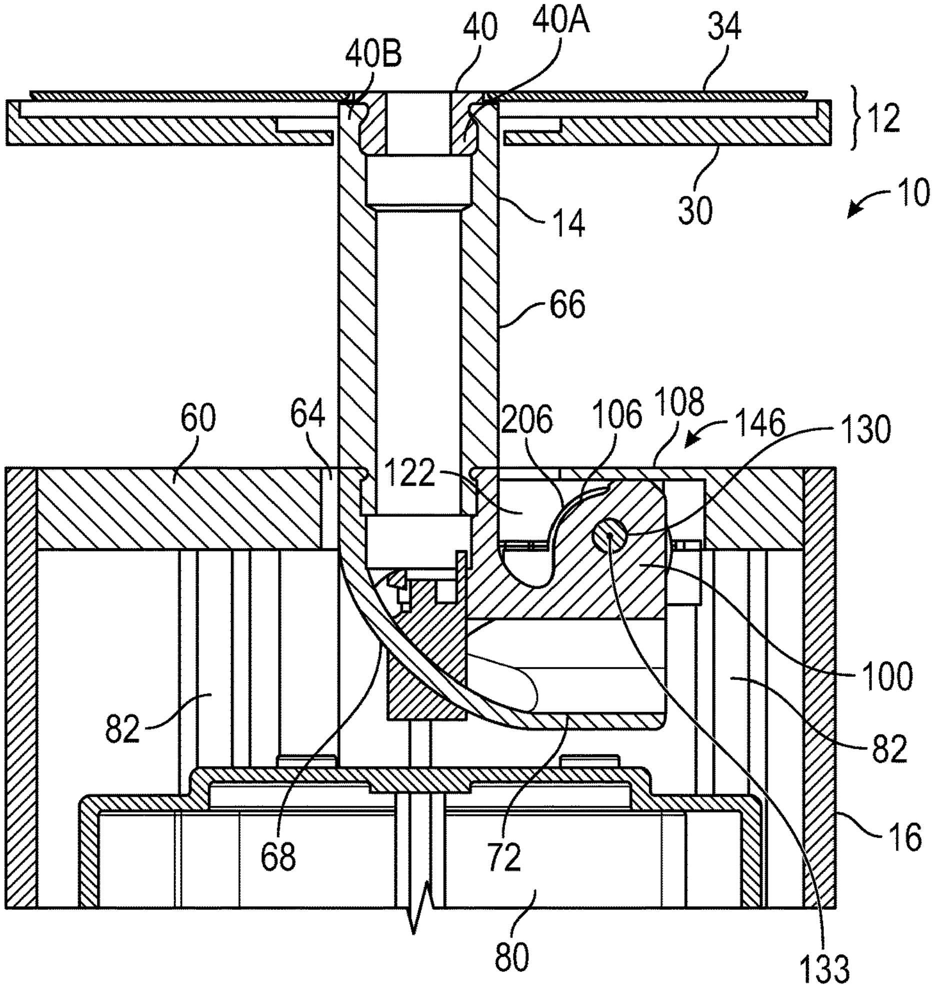
FIG. 6B is a cross-sectional view of the light assembly in a downward position.

Referring now to FIGS. 6A and 6B, the light fixture 10 is illustrated in a downward position in FIG. 6A. In FIG. 6B, the light fixture 10 is illustrated in a downward position at a cross-section through the pin 130. In FIG. 6B, the flange 108 is disposed out of the recessed groove 122.

Figure 7A:
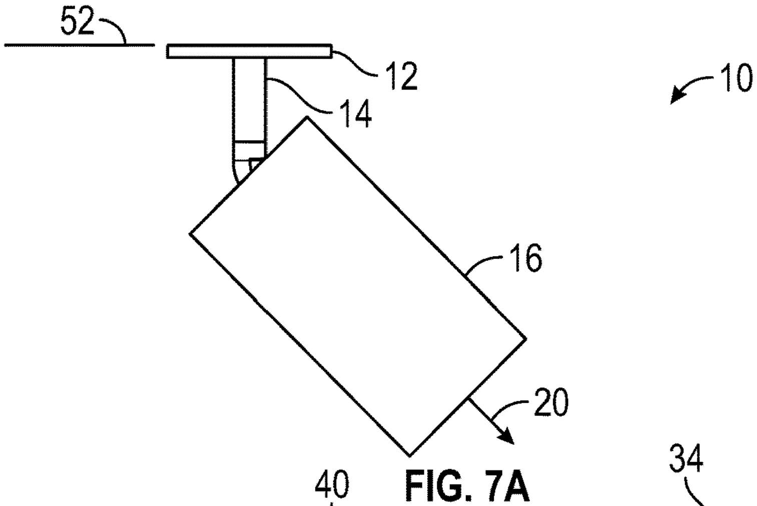
FIG. 7A is an elevational view of the light assembly in an angled position.
Figure 7B:
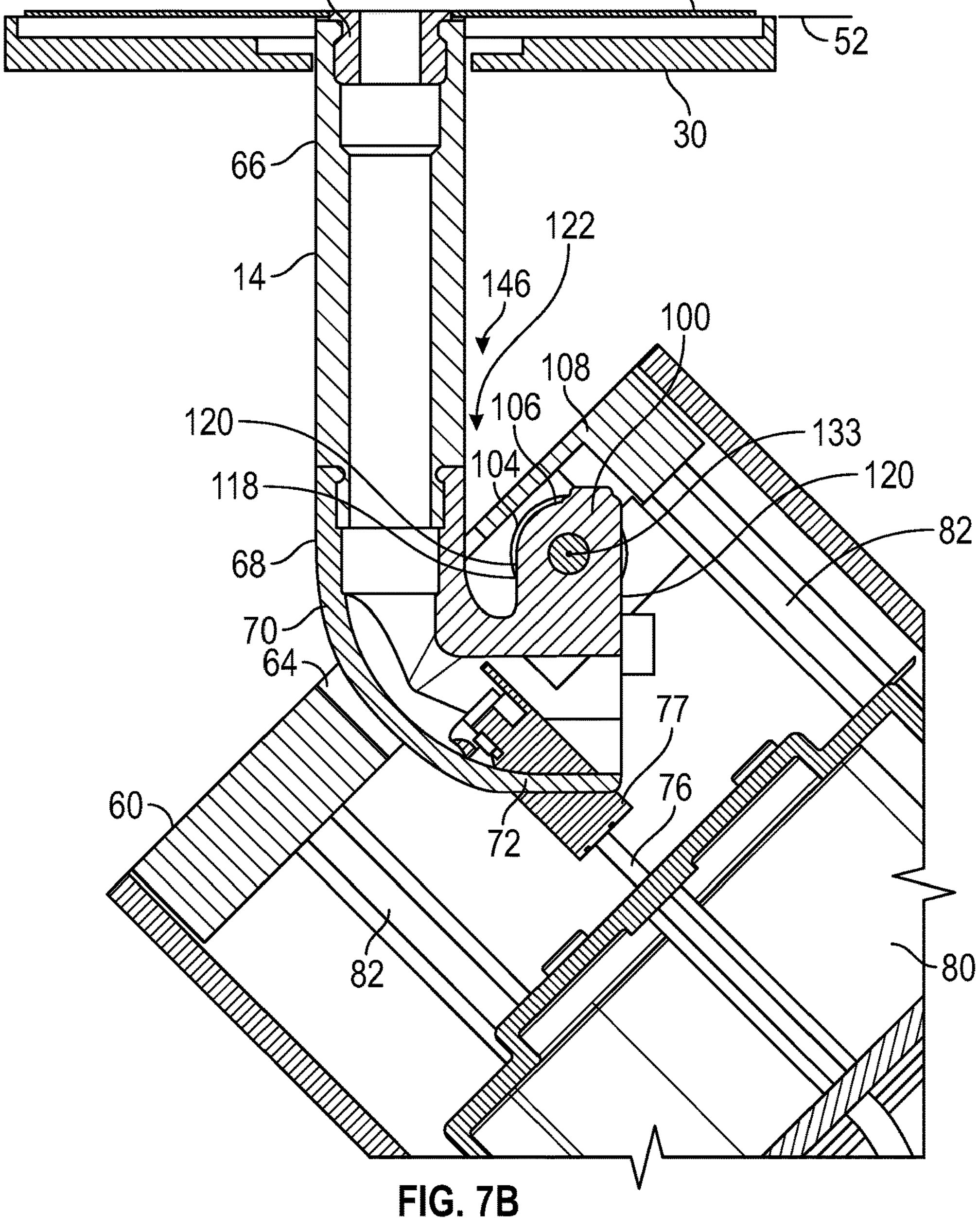
FIG. 7B is a cross-sectional view of the light fixture of FIG. 7A.

Referring now to FIGS. 7A and 7B, the light fixture 10 is illustrated having the housing 16 located at an angle relative to the electrical box or ceiling 52. In this example, the flange 108 is partially within the recessed groove 122 between the second wall 120 and the second portion 68 of the stem 14.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A light fixture comprising:

a stem comprising a first portion and second portion disposed at an angle relative to the first portion;

an elongated housing comprising at least one axially extending outer wall and a body cap coupled to an end of the outer wall, said body cap comprising an opening receiving the stem therethrough, said housing comprising a light source therein;

a coupler extending from the second portion of the stem and coupled to the body cap within the elongated housing; and said body cap rotatable about an axis of rotation defined through the coupler, said second portion of the stem disposed at least partially within the elongated housing.

2. The light fixture of claim 1 wherein a first axis of the first portion is perpendicular to a second axis of the second portion.

3. A light fixture comprising:

a stem comprising a first portion and second portion disposed at an angle relative to the first portion;

a housing comprising a body cap, said body cap comprising an opening receiving the stem therethrough, said housing comprising a light source therein;

a coupler extending from the second portion; and said body cap rotatable about an axis of rotation defined through the coupler;

the coupler comprising a first hold down and a second hold down coupled to the body cap, said coupler comprising a first pin portion coupled between the first hold down and the body cap and a second pin portion coupled between the second hold down and the body cap so the body cap rotates about the first pin portion and the second pin portion.

4. The light fixture of claim 3 wherein the first pin portion is formed by a torque engine.

5. The light fixture of claim 4 wherein the torque engine comprises a first head and a pin, said pin extending into the coupler.

6. The light fixture of claim 5 wherein the body cap comprises a first recess receiving at least a portion of the first head and the second portion of the stem.

7. The light fixture of claim 6 wherein the first hold down comprises a first groove, said first hold down holding the first pin portion within the first groove and the recess and the second hold down comprises a second groove, said second hold down holding the second pin portion within the second groove and the recess.

8. The light fixture of claim 1 wherein the coupler is disposed parallel to the first portion of the stem.

9. The light fixture of claim 1 further comprising a fastener lock disposed through the body cap, said fastener lock engaging the coupler.

10. The light fixture of claim 1 wherein the stem is hollow, said light source coupled to a wire extending within the stem.

11. The light fixture of claim 1 wherein the light source comprises light emitting diodes.

12. The light fixture of claim 1 wherein the first portion comprises a first longitudinal axis, the second portion comprises a second longitudinal axis and the coupler comprises a third longitudinal axis perpendicular to the first longitudinal axis and the second longitudinal axis.

13. The light fixture of claim 1 wherein the housing is cylindrical.

14. The light fixture of claim 1 wherein the housing comprises a cavity disposed between the body cap and an inner housing, said cavity receiving at least a portion of the second portion.

15. A light fixture comprising:

a hollow stem comprising a first portion and a second portion disposed perpendicular to the first portion;

a housing comprising body cap, said body cap comprising an elongated opening receiving the second portion of the hollow stem therethrough, said housing comprising a light source coupled to wires extending through the hollow stem;

a coupler extending perpendicular to the second portion and parallel to the first portion, said coupler comprising a first pin portion axially aligned with a second pin portion;

a first hold down coupling the first pin portion to the body cap; and a second hold down coupling the second pin portion to the body cap, so that the body cap and housing rotate relative to the coupler.

16. The light fixture of claim 15 wherein said first pin portion and said second pin portion are disposed on an axis perpendicular to the first portion and the second portion.

17. The light fixture of claim 16 wherein the first pin portion is formed by a torque engine comprising a first head and a pin, said body cap comprises a recess, wherein the first hold down holds the first head in the recess and the second hold down holds the second pin portion in the recess.

18. The light fixture of claim 17 further comprising a fastener lock disposed through the body cap at the recess, said fastener lock engaging the coupler.

19. The light fixture of claim 15 wherein the first portion comprises a first longitudinal axis, the second portion comprises a second longitudinal axis and the coupler comprises a third longitudinal axis perpendicular to the first longitudinal axis and the second longitudinal axis.

20. The light fixture of claim 15 wherein the housing comprises a cavity disposed between the body cap and a driver, said cavity receiving at least a portion of the second portion.

* * * * *